JOHN GEORGE SPENCER

*Inventor*

United States Patent Office 3,489,639
Patented Jan. 13, 1970

3,489,639
POLYPROPYLENE/GLASS FIBRE LAMINATE
John G. Spencer, Meriden, England, assignor to British Celanese Limited, London, England, a British company
Continuation-in-part of application Ser. No. 327,353, Dec. 2, 1963. This application July 19, 1967, Ser. No. 654,530
Claims priority, application Great Britain, Dec. 5, 1962, 45,909/62; Aug. 21, 1963, 33,033/63
Int. Cl. B32b 27/32, 27/12, 17/02
U.S. Cl. 161—93        5 Claims

ABSTRACT OF THE DISCLOSURE

A laminated structure comprises a sheet of isotactic polypropylene and a layer of glass fibre/resin bonded to an intermediate layer of a fabric made of glass fibres and polypropylene fibres. The fabric preferably is constructed so that the majority of the polypropylene fibres are next to the polypropylene sheet and the majority of the glass fibres are next to the glass fibre/resin layer.

---

Figure 1:
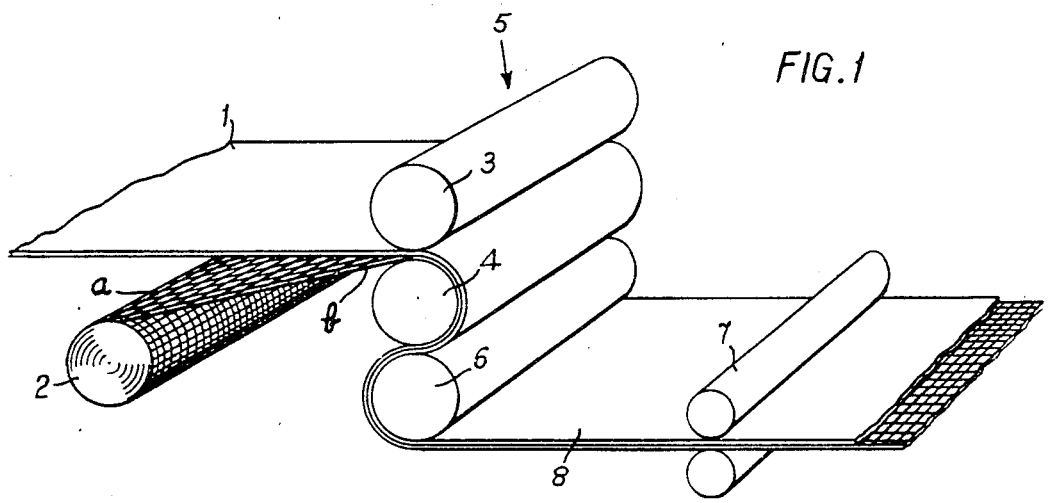

This application is a continuation-in-part of my application Ser. No. 327,353, filed Dec. 2, 1963, now abandoned.

This invention relates to a laminated structure of a polypropylene sheet bonded to a reinforcing layer of glass fibres embedded in resin. Such a laminate combines the chemical inertness of the polypropylene sheet with the strength of the glass fibre/resin layer whilst remaining of light weight. However, in order to obtain the advantage of these combined properties it is necessary for there to be a strong bond between the laminate components. It is difficult to produce a satisfactory bond between a polypropylene sheet and a glass fibre/resin layer.

According to this invention a laminated structure comprises a sheet of polypropylene, a fabric including glass fibres and polypropylene fibres, and a layer of glass fibres embedded in a solid resin, opposite faces of the fabric being bonded respectively to a face of the polypropylene sheet and a face of the resin/glass fibre layer.

The fabric and the sheet may be bonded by any convenient method but preferably by pressing the fabric upon the surface of the sheet after the latter has been softened by heating, and subsequently cooling the structure. The fabric itself may be heated to soften the thermoplastic polypropylene fibres in addition to or instead of heating the sheet. In a preferred method the fabric is pressed upon a surface of the sheet immediately after extrusion whilst it is still in a softened state, for example in a calender. In any process using heat the sheet and/or the fabric should be brought to a temperature at or above the softening point of the polypropylene at least whilst the pressure is applied, but should not be heated above the melting point thereof.

The fabric may be woven or knitted or may simply be a non-woven fibrous structure such as chopped strand mat. In order to facilitate the bonding of the polypropylene fibres of the fabric to the polypropylene sheet the fabric is preferably constructed so that the major proportion of the glass fibres is near one surface and the major proportion of the polypropylene fibres is near the other surface, and the latter surface is bonded to the sheet. Such a construction can be achieved in a woven fabric by using a satin weave. For example a satin weave may be used with a warp formed wholly from glass fibres and a weft including glass and polypropylene fibres. Examples of such fabrics which have been used in the present invention are an 8 shaft satin construction having 56 ends per inch of 225⅓ (glass count system) monofilament glass yarn in the warp and 54 picks per inch of one of the three following wefts:

(1) 3 ends of 150–2/0 glass yarns spun with three turns per inch "S" twist with a 250 denier unstretched polypropylene monofilament yarn.
(2) 3 ends of 150–2/0 glass yarn spun with 3.3 turns per inch "S" twist with a 640 denier 75 filament unstretched polypropylene multifilament yarn.
(3) 4 ends of 150–2/0 glass yarn spun with 3.3 turns per inch "S" twist with a 640 denier 70 filament unstretched polypropylene multifilament yarn.

These yarns were chosen so as to give yarns of a similar weight to those normally woven on glass weaving machinery and for this reason are only exemplary. When bonded to a polypropylene sheet, fabrics produced in the examples given in the preceding paragraph showed 100 percent increase in peel strength, measured by pulling the laminate apart at 180°, compared with a pure glass fabric bonded to a polypropylene sheet.

These fabrics were bonded to a 0.070 inch thick polypropylene sheet extruded at 240° C. by passing a fabric and sheet together through a three calender roll take-off unit. The fabric and sheet passed between the top and centre rollers first. The temperatures used for the calender rolls were:

| | °C. |
|---|---|
| Top roll | 30–90 (optimum 50) |
| Centre roll | 70–90 (optimum 75) |
| Bottom roll | 70–120 (optimum 90) |

The total thickness of the unbonded sheet and fabric was 0.080 inch and the gap used between the top and centre rolls was 0.070 inch. The resulting bond in the laminate had a peel strength of about 15 pounds per inch when the fabric and sheet were pulled at 180° to each other.

The tension of the cooling sheet between the nip rolls of the extruder and the calender rolls should always be accurately controlled to minimise distortion and induced stress or strain in the sheet.

In the case of thicker polypropylene sheets it may be desirable to feed the newly extruded sheet alone between the top and centre rolls and to feed the fabric with it between the centre and bottom rolls. This enables the sheet to be cooled to some extent before the fabric is bonded to it, thereby reducing residual stresses.

The thickness of the sheet used will depend upon the particular end use for which the laminated structure is destined. However, sheets of polypropylene thicker than 1½ inches are normally sufficiently strong and do not require reinforcement so that for the majority of practical applications the sheets used will be between 0.001 and 1½ inches thick. For industrial plant purposes the range of thickness will normally be between 0.040 and 0.375 inch.

The glass fibre/resin layer is formed in situ on the glass fibre/polypropylene fibre fabric which is bonded to the polypropylene sheet. This may be done in the factory when preformed articles such as construction panels are being made or on site when large complicated constructions are being made.

There are several ways of laying on the glass fibre and the resin. One way involves first thoroughly wetting out the glass fibre/polypropylene fibre fabric with the resin, laying on glass fibre by hand, either in the form of a fabric or as chopped strand mat, and then laying on resin by hand so as to thoroughly embed the already laid layer of glass fibre. This procedure is repeated until the desired thickness of the glass fibre/resin layer has been built up. The resin may also be sprayed onto the glass fibre from a gun which is fed with the resin precursor, a curing agent and a catalyst for the curing reaction, these being mixed in the nozzle of the gun before emerging as a spray. An alternative method is to spray both the resin and the glass fibre simultaneously from the same gun. In this case glass fibre in the form of chopped strand mat is fed to the gun in addition to the resin-forming ingredients. Another method which is known as filament winding is used for laying glass fibre/resin onto the glass fabric when the latter and the polypropylene sheet to which it is bonded are in the form of piping with the glass fabric outermost. After the glass fibre/polypropylene fibre fabric has been wetted out with resin, glass fibre in the form of a tow, for example of 114 denier and 60 ends, is wound in a close helix around the piping and then more resin is applied either by hand or by spraying. Again, the procedure is repeated until the desired thickness has been built up.

The resin may be any that is commonly used with glass fibre, for example polyester, epoxy, phenolic or furan, but is preferably polyester for reasons of economy.

The laminated structure of the invention has many end uses but finds its most appropriate end use in circumstances which demand the chemical inertness and corrosion resistance of the polypropylene sheet. Thus it can be used for piping, tanks and chemical plant vessels of all kinds, wad tankers and construction panels. When it is used as a building panel the laminated structure may have a decorative finish applied to the face of the polypropylene sheet.

The invention is illustrated, by way of example, by the accompanying drawing in which: FIGURE 1 is a diagrammatic perspective drawing of a three-roll calender for bonding the polypropylene sheet to the glass fibre/polypropylene fibre fabric, and FIGURE 2 is a diagrammatic sectional elevation through a laminated structure according to the invention in which the glass fibre/resin layer is being sprayed on from a gun.

In FIGURE 1 a newly extruded sheet 1 of polypropylene is fed with a fabric 2, woven with a satin weave with a warp of glass fibre yarns and a weft of yarns containing glass and polypropylene fibres, between the top and middle rolls 3, 4 of a three roll calender 5, around the middle roll 4, between the middle roll 4 and the bottom roll 6 and then between a pair of take-off nip rolls 7 which control the tension with which the laminate 8 of the sheet 1 and the fabric 2 is drawn off from the bottom roll. The fabric 2 is fed to the rolls so that its surface $a$ which contains a major proportion of the polypropylene fibres is adjacent to the sheet 1 and its surface $b$, which contains a major proportion of the glass fibres, is remote from the sheet 1.

Figure 2:
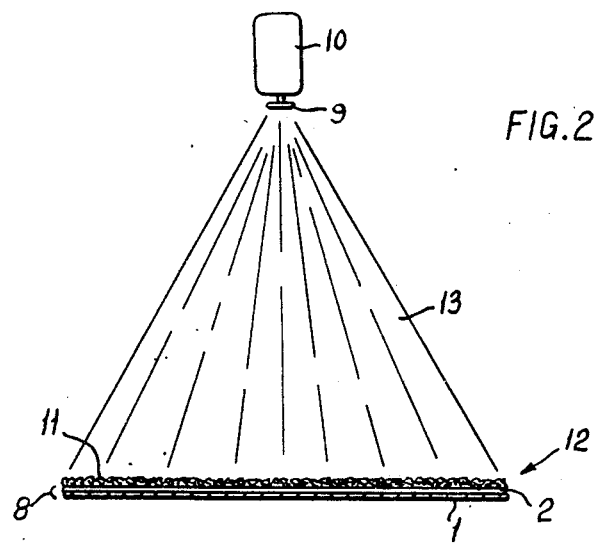

In FIGURE 2, the laminate 8 is laid flat with the fabric 2 uppermost and glass fibre in the form of chopped strand mat and polyester resin are sprayed onto the fabric 2 from the nozzle 9 of a gun 10 to form a glass fibre/resin layer 11 bonded to the fabric 2. The resulting three-layer laminated structure 12 is that of the invention. The spray of glass fibre and resin is designated 13.

What I claim is:

1. A laminated structure comprising a sheet of polypropylene, a fabric including glass fibres and polypropylene fibres, and a layer of glass fibres embedded in a solid resin, opposite faces of the fabric being bonded respectively to a face of the polypropylene sheet and a face of the resin/glass fibre layer.

2. A laminated structure as claimed in claim 1 in which the fabric is woven.

3. A laminated structure as claimed in claim 1 in which the fabric is constructed with the majority of the polypropylene fibres near to that surface which is bonded to the polypropylene sheet and with the majority of the glass fibres near to that surface which is bonded to the resin/glass fibre layer.

4. A laminated structure as claimed in claim 3 in which the fabric is woven.

5. A laminated structure as claimed in claim 4 in which the fabric is woven with a satin weave.

References Cited

UNITED STATES PATENTS

| | | | |
|---|---|---|---|
| 2,475,083 | 7/1949 | Davis | 161—92 |
| 2,482,164 | 9/1949 | Finlayson et al. | 161—92 |
| 2,642,370 | 6/1953 | Parsons et al. | 161—93 |
| 2,828,776 | 4/1958 | Meyer | 161—92 |
| 3,131,113 | 4/1964 | Arbit et al. | 161—151 |
| 3,205,913 | 9/1965 | Ehlers | 161—92 |

DOUGLAS J. DRUMMOND, Primary Examiner

U.S. Cl. X.R.

161—170, 252